J. AMBICKY.
KNIFE.
APPLICATION FILED DEC. 2, 1916.

1,235,870.

Patented Aug. 7, 1917.

INVENTOR
John Ambicky.
BY
Dyke & Canfield
ATTORNEYS.

UNITED STATES PATENT OFFICE.

JOHN AMBICKY, OF EAST ORANGE, NEW JERSEY, ASSIGNOR OF ONE-HALF TO SAMUEL PELLECK, OF NEWARK, NEW JERSEY.

KNIFE.

1,235,870.  Specification of Letters Patent.  Patented Aug. 7, 1917.

Application filed December 2, 1916. Serial No. 134,760.

*To all whom it may concern:*

Be it known that I, JOHN AMBICKY, a subject of the Emperor of Austria, and a resident of East Orange, county of Essex, and State of New Jersey, have invented certain new and useful Improvements in Knives, of which the following is a specification.

This invention relates to an improved paring knife that is of the kind that has a knife projecting slightly from the body portion of the utensil usually by being struck up from the material of which the knife is made, and in this way a paring cannot be made that is unduly thick, as the body portion of the knife and the cutting edge provide only a certain amount of room through which a paring can pass and it acts as a gage to prevent the knife from entering too far into the vegetable or fruit being pared.

A further object of the invention is to provide a knife of this kind in which the parings are directed so that they emerge from the knife opposite the operator and are thus directed out the side of the knife that is in rear of the blade.

A still further object of the invention is to provide a blade that is arranged on the body portion of the knife, which blade is opposite an opening that is constructed to materially reduce the chances of the opening between the blade and the body portion of the knife becoming clogged with parings or fragments of vegetables or fruit.

Figure 1:
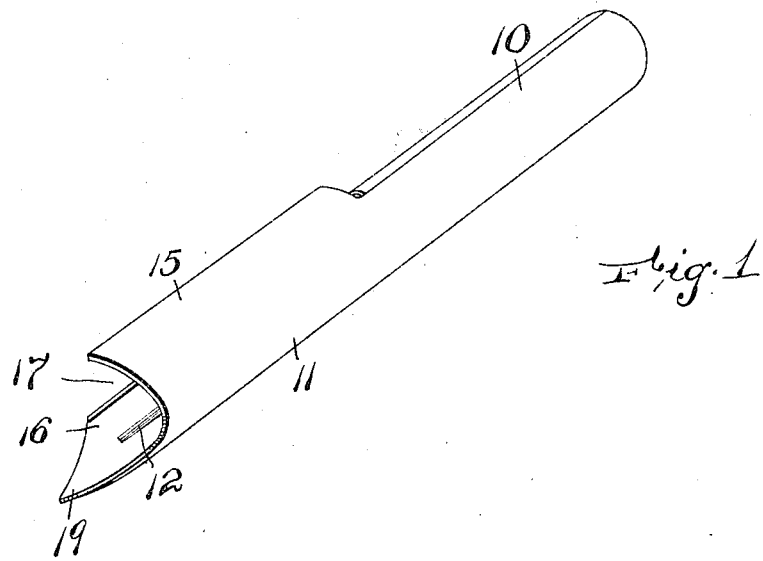
Figure 2:
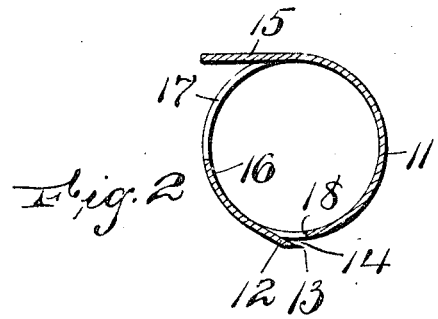
Figure 3:
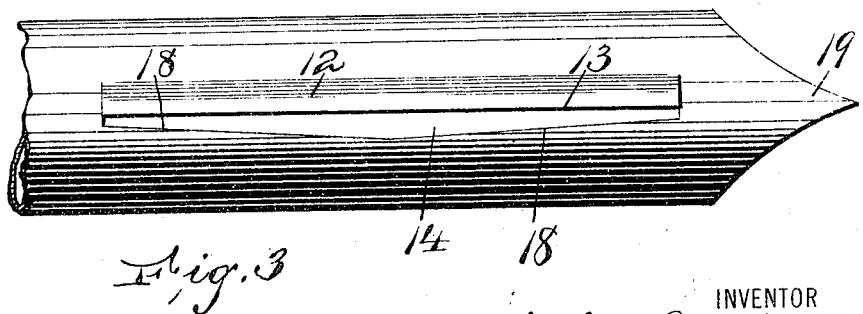

The invention is illustrated in the accompanying drawing, in which Figure 1 is a perspective view of my improved knife. Fig. 2 is a cross-section of the cutting portion of the knife, this view being enlarged, and Fig. 3 is a bottom view of part of the knife shown in Fig. 2.

This knife can be made in many different ways and can be attached to the handle portion as desired, but for the purpose of making a cheap knife, it is usually made up of one sheet of metal rolled as at 10 to form a handle part, preferably cylindrical, and the projecting body portion 11 is provided at the bottom with a blade 12 which can be attached to the knife in any well known manner, but is preferably struck up therefrom and then sharpened at its front edge to form the cutting edge 13 and is offset sufficiently from the body portion of the knife to provide a space 14, which space permits the passage of a paring but prevents any paring of undue thickness being taken from the fruit or vegetable, as will be evident. It has been customary to make the knife portion in the shape of a semi-circular trough or less than a semi-circle, and in constructions of this kind, since it is usual to grasp the knife and move it toward the operator in the process of paring, the parings are curled over as they leave the blade and thus are caused to curl over that edge of the knife nearest the operator, and as a consequence many of the parings fall outside of the pan over which the vegetable is usually held and sometimes into the lap of the operator, and they are thus annoying and cause extra labor in picking them up afterward.

In my improved structure the parings are directed away from the operator and out of that part of the knife that is in rear of the blade, the material of the knife being formed so that a shield 15 is projected over the part 16 of the body portion of the knife, thus forming a space 17 between them, which space allows the parings to emerge at that point. The shield 15 is formed by straightening out that part of the body portion above and in rear of the blade and parings that pass up through the openings 14 into the body portion are directed by the shield 15 and the part 16 out through the opening 17, and when the knife is used by operating it toward the person using the knife, the parings are deposited out of the rear and fall into the pan, that is, away from the operator, and they are thus not apt to interfere with a view of the part of the vegetable or fruit to be pared. The knife has a still further improvement in the fact that the opening 14 has the edge 18 opposite the cutting edge 13 of the blade 12 made larger in the center than it is at the ends, that is, the central portion is further removed from the blade than the ends. This is done to correct a disadvantage in knives that have a straight edge at this point, since knives of this kind are very apt to clog and parings will break when they are about to be pulled from this space after being wedged into it, whereas in this improved construction, such parings as are cut near the ends of the blade 12 have an inclination to move toward the center on account of the widened space and the consequent easier passage of the paring at the center portion. This materially cuts down the chances of clogging, and but few parings become wedged between the blade of the knife and the edge of the material opposite the cutting edge of the blade.

This knife can be provided with the usual pointed end 19 which is used for digging out the eyes of potatoes and similar spots in articles to be pared, and the device can also be used as a corer to be pssed through an apple or the like to take the core out, the main invention, however, being a knife that directs the parings out through the rear thereof, and in which the knife is provided with an opening opposite the blade that is not apt to clog.

Having thus described my invention, I claim:

1. A knife comprising a body portion with a trough-like bottom and a shield extending over said bottom and providing a space at one side thereof between the trough and shield, and a blade projecting from the trough-like part with its rear edge near the space, the trough-like part having an opening directly in front of the blade.

2. A knife comprising a body portion of substantially tubular form with a space formed by a flattened top portion, the body portion having an opening near the edge of the space opposite the top portion, and a blade on the side of said opening next to the space.

3. A knife provided with a projecting cutting edge between its side edges and having an opening adjacent to the blade, the opening being wider at the center than at the ends.

4. A knife formed with a cutting edge struck up at an angle thereto and having an edge opposite the cutting edge, thus forming an opening between them, the opening being wider at the center than at the ends.

In testimony that I claim the foregoing, I hereto set my hand, this 1st day of December, 1916.

JOHN AMBICKY.

Copies of this patent may be obtained for five cents each, by addressing the "Commissioner of Patents, Washington, D. C."